W. P. AIRHEART.
SPRING WHEEL STRUCTURE.
APPLICATION FILED MAR. 15, 1911.

1,002,110.

Patented Aug. 29, 1911.

UNITED STATES PATENT OFFICE.

WILLIAM P. AIRHEART, OF DETROIT, MICHIGAN.

SPRING-WHEEL STRUCTURE.

1,002,110.

Specification of Letters Patent. Patented Aug. 29, 1911.

Application filed March 15, 1911. Serial No. 614,555.

*To all whom it may concern:*

Be it known that I, WILLIAM P. AIRHEART, a citizen of the United States, residing at Detroit, in the county of Wayne, State of Michigan, have invented certain new and useful Improvements in Spring-Wheel Structures; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to spring wheel structures, especially designed for use in motor vehicles, and consists in the combination and association of parts hereinafter more fully set forth and pointed out in the claim.

The object of the invention is to provide simple and efficient means for suspending the axle resiliently within the tread or outer rim of the wheel in a manner to absorb the shock and jar, and prevent the full transmission thereof to the axle of the vehicle, provision being made for securely but flexibly connecting the concentric rigid portions of the wheel through the medium of the interposed shock-absorbing members.

The above object is attained by the structure illustrated in the accompanying drawings, in which:—

Figure 1:
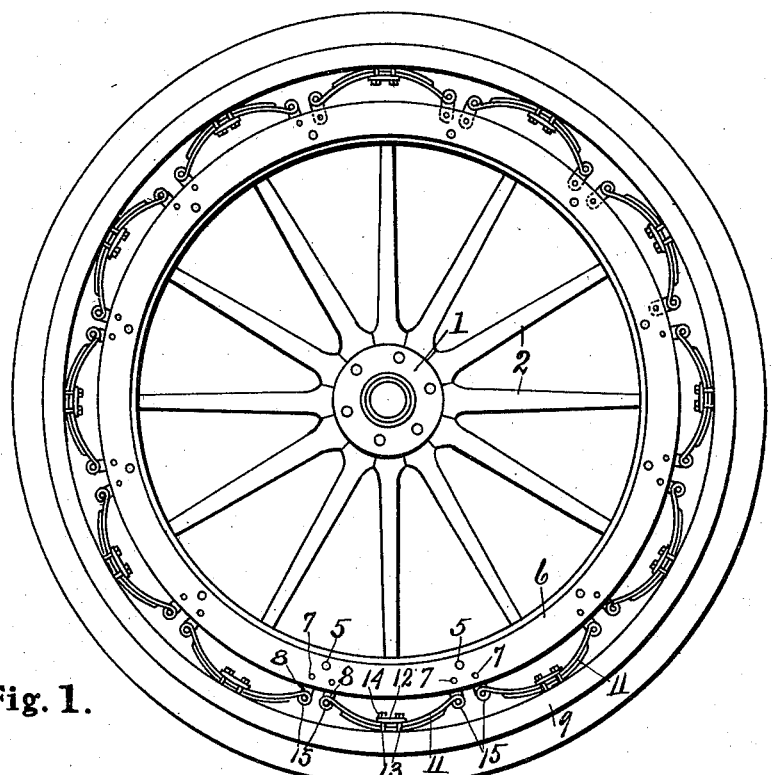
Figures 2, 3, 4:
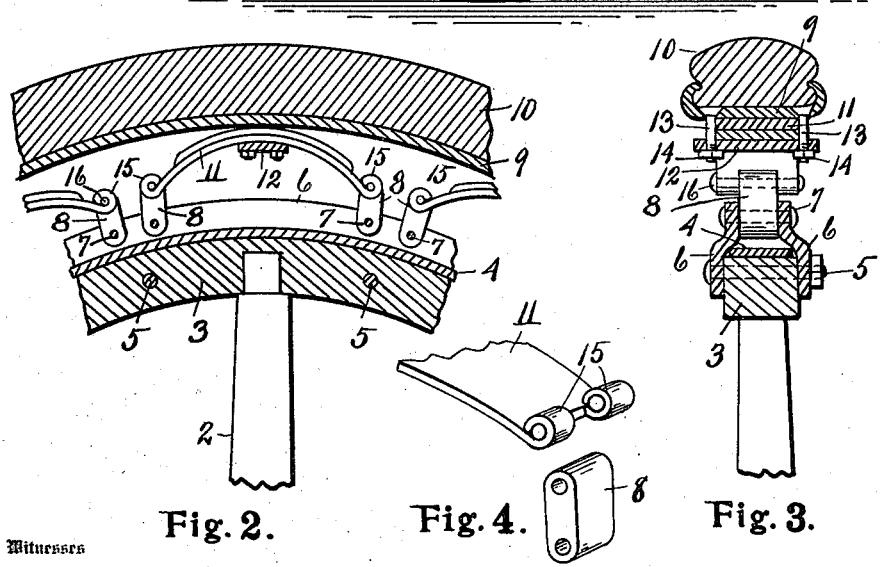

Figure 1 is a side elevation of a vehicle wheel involving my invention. Fig. 2 is a fragmentary view in circumferential section through the inner and outer rims, the spring members appearing in elevation. Fig. 3 is a transverse section through the spaced concentric rims, tire, and felly, the interposed spring members appearing in elevation. Fig. 4 is a fragmentary view in perspective of the end portion of one of the springs and one of the steel links through the medium of which the ends of the springs are jointedly connected to the inner rim.

Referring to the characters of reference, 1 designates the hub of the wheel and 2 the spokes thereof. Carried by and connecting the outer ends of the spokes is a felly 3, preferably of wood, embraced by a metal ring or tire 4. Secured to the sides of the felly by transverse bolts 5 are the metal rings 6 whose outer marginal portions are brought somewhat closer together than the parts which embrace the felly and between which contracted marginal portions are pivoted upon transverse bolts or pivot pins 7, the inner ends of the steel links 8, said links being free to turn upon said pivot bolts but are held by the embracing faces of the rings against undue lateral movement. The rings 6 when secured in place form what may be termed the inner rim of the wheel.

The outer rim 9 of the wheel is herein illustrated as of the "clencher" type and seated therein is a tire 10, preferably of rubber.

Interposed between the rims of the wheel are a plurality of springs 11 of semi-elliptical type, which at their central portions are secured to the outer rim by means of the cross plates 12 which lie thereon and the clip bolts 13 which extend from the rim 9 through said plates and receive the nuts 14. The free ends of the springs which curve inwardly are provided with a divided eye 15 between the sides of which the outer ends of the links 8 are pivoted by the transverse pivot bolts 16, thereby effecting a connection between the outer and inner rims of the wheel through the medium of the springs 11 and the links 8, whereby said rims are flexibly connected in a manner to suspend the inner rim within the outer rim through the medium of the interposed springs, said springs having such connection with the inner rim as to afford freedom of movement in the matter of elongation and contraction, the connected links 8 turning on their pivot bolts in the inner rim to accommodate said movement of said springs. While the springs are rigidly secured to the outer rim 9, their connection with the inner rim is flexible and indirect, giving to the springs the function of shock absorbers which take up and minimize vibration to such an extent as to, in a great measure, relieve the axle from jar.

Having thus fully set forth my invention, what I claim as new and desire to secure by Letters Patent, is:—

A vehicle wheel comprising inner and outer rims, the inner rim consisting of opposed rings attached to the felly in parallel relation to project beyond the face thereof, semi-elliptic springs rigidly secured to the outer rim, a plurality of links pivoted at one end between the projecting rings forming the inner rim and held by the sides of said rings against lateral movement, the other ends of said links being pivotally coupled to the free ends of said springs.

In testimony whereof, I sign this specification in the presence of two witnesses.

WILLIAM P. AIRHEART.

Witnesses:
 O. B. BAENZIGER,
 I. G. HOWLETT.

Copies of this patent may be obtained for five cents each, by addressing the "Commissioner of Patents, Washington, D. C."